April 14, 1970     C. NUNEZ     3,506,977
HYDRAULIC SAFETY DEVICE

Filed Feb. 1, 1968     2 Sheets-Sheet 1

INVENTOR.
CARLOS NUÑEZ
BY
ATTORNEYS

April 14, 1970  C. NUNEZ  3,506,977
HYDRAULIC SAFETY DEVICE
Filed Feb. 1, 1968  2 Sheets-Sheet 2
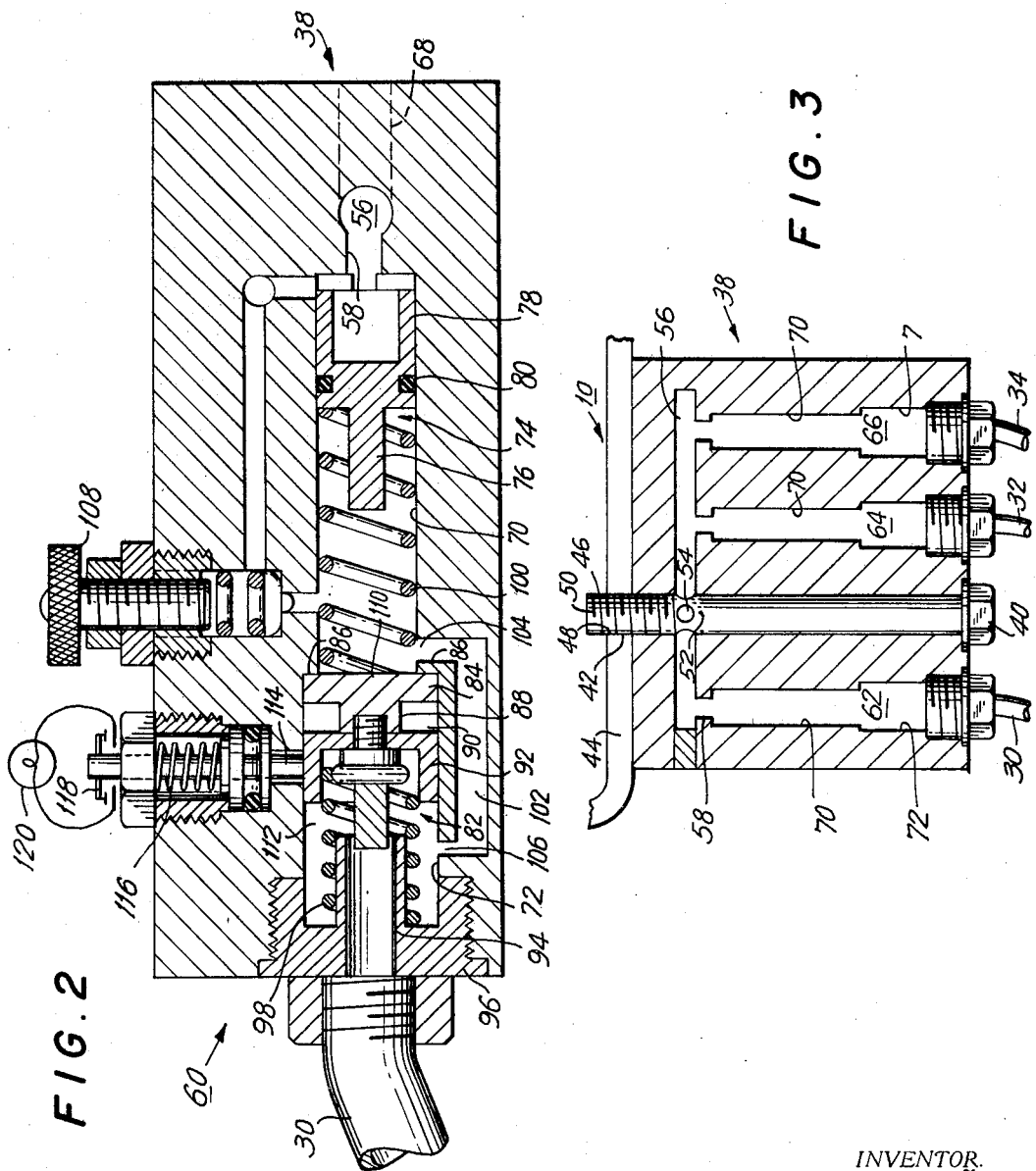
INVENTOR.
CARLOS NUÑEZ
BY
Ostrolenk, Faber, Gerb & Soffen
ATTORNEYS

United States Patent Office 3,506,977
Patented Apr. 14, 1970

3,506,977
HYDRAULIC SAFETY DEVICE
Carlos Nunez, Brooklyn, N.Y., assignor to Hydraulic Safety Valve, Inc., Glendale, N.Y., a corporation of New York
Filed Feb. 1, 1968, Ser. No. 702,252
Int. Cl. F15b 13/06; B60t 11/10, 17/18
U.S. Cl. 60—54.5   11 Claims

ABSTRACT OF THE DISCLOSURE

A hydraulic safety valve device especially useful in automobile braking systems of the closed hydraulic pressure type. In the event of either slow or rapid leaks in the system, the device removes from operation that portion of the hydraulic system which is leaking, without interferring with or permitting the loss of hydraulic fluid from the remainder of the system which is functioning normally. A novel variable cross-sectional area piston arrangement permits rapid sealing and isolating of that portion of the system which is leaking.

---

Figure 1:
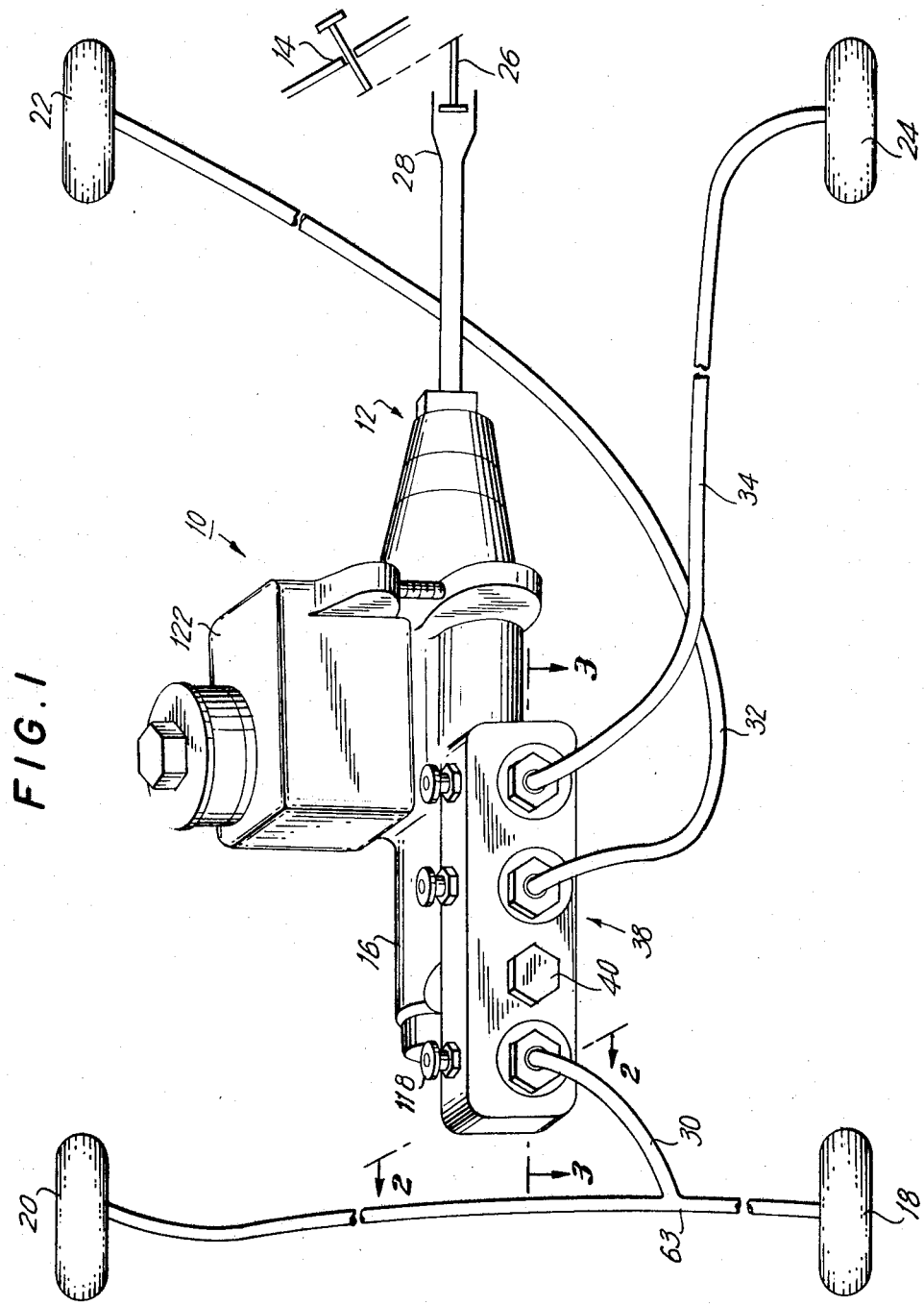

This invention relates to safety valve devices and more particularly relates to a hydraulic safety valve device which is rapidly operable to isolate a leaking portion of a closed hydraulic pressure system.

Closed hydraulic pressure systems are well known and are typically exemplified by the hydraulic braking systems utilized in automobiles today. In its usual make up, such a system generally employs a master brake cylinder, one end of which is operatively connected to the brake pedal of the vehicle while the opposite end of which communicates, by means of various conduits, with expandable brake shoes associated with the drums of each of the wheels of the vehicle.

With today's concern for traffic fatalities and the soaring rate of traffic accidents, automobile designers have been concentrating their efforts on safety devices in general and especially safety devices which will improve the reliability of the braking systems. The necessity of some type of added safety for the braking system is apparent when one realizes that by far, the great majority of cars on the road today include a braking system which will become totally inoperative in a very short period of time in the event of the failure of virtually any portion of the overall system. Even if a small conduit or fitting develops a leak at only one of the four wheels of the automobile, the *entire* system will soon be inoperative.

Some manufacturers have gone so far as to provide dual braking systems including dual master cylinders which will provide a redundancy type of safety factor in the event that there is a leak of fluid from either system. Others have suggested that rather than duplicate the entire braking system, it would be more desirable to provide a safety valve type of device which would quickly seal off or isolate any leaking portion of the braking system from the remainder of the system which is still in satisfactory condition. In this way, even though the braking capability has been removed from say one or two wheels, the vehicle can still be safely brought to a stop.

As between duplicate braking systems or a safety device which will isolate a leaking portion in the system, economics obviously dictate the latter. However, for many years, engineers have been struggling to design a safety valve which will have all the required characteristics. Thus, such a valve must be extremely quick-acting, otherwise the system will lose a dangerous amount of fluid before the valve has a chance to seal off the leaking portion. At the same time, such valve must be capable of reacting to various situations which may occur. The valve must rapidly act to isolate a portion of the system which has experienced a complete failure such as a severance or a rapid leak and, at the same time, must be capable of reacting to different problems inherent when slow leaks exist over extended periods of time.

With a very slow leak, say at one tire, it is not necessary or desirable that the braking system to that tire be quickly isolated from the remainder of the system. In fact, most braking systems in use today include a fluid make up feature which can replenish a slowly leaking system for a given length of time without loss of operation. However, when, and only when, that excess fluid has been lost through the slow leak, then the safety valve in question must rapidly function to isolate the leak for the remainder of the system.

In addition to all of the above operating characteristics, such a safety valve must be simple, reliable, inexpensive, and easily adaptable to conventional systems. With all of these exacting requirements, it is easy to understand why, up until the present invention, nobody has been able to design such a shut-off type of safety valve sufficiently acceptable to be required or at least standard equipment in automobile braking systems or indeed any hydraulic system where human life is at stake.

As suggested above, the instant invention resides in a novel hydraulic safety device of the isolating shut-off valve type, but by means of a combination of elements and parts to be described in detail below, meets all of the operational characteristics required, while at the same time is simple, reliable, inexpensive to manufacture, and easily adaptable to existing pressure systems in such a manner as to optimumly guarantee fail-safe operation. More specifically, in a preferred embodiment, the safety valve of the instant invention is divided into two main chambers, one of which communicates with the master cylinder of the system, while the second of which communicates with the conduit systems which lead to the brake shoes of the individual wheels. Pressure is transferred between the two chambers by means of a first piston traveling within the safety valve device. It is to be appreciated that even in the event of complete loss of fluid beyond the aforementioned piston, the fluid integrity of that portion of the braking system which includes the master cylinder will be assured.

To achieve rapid isolation in response to a rapid leak, the safety valve of the instant invention includes a second piston which effectively divides the above described second chamber into two further areas. By means to be further described, in normal operation the second piston is so seated that a relatively small cross-sectional area of such piston is exposed to fluid pressure. With the second piston so seated, the pressure on the smaller cross-sectional area is insufficient to move the piston against the forces on the other side which include both fluid pressure and a biasing spring. However, when a rapid leak develops in a portion of the braking system, the pressure retaining the second piston in its seat rapidly decreases such that the piston becomes unseated. Once the piston becomes unseated, the remainder of its previously unexposed cross-sectional area becomes exposed to fluid pressure so that the piston is rapidly shifted to the opposite end of its respective area. Such movement functions to seal off an exit port of the safety device thereby isolating the leaking portion of the system from the remainder thereof.

In the event of slow leaks, the loss of pressure is not sufficient to unseat the second piston and consequently there will be a steady but slight loss of fluid as the brakes are continually applied. However, and as will be described in greater detail, each time the brakes are applied, the aforementioned first piston is incrementally moved toward the second piston. Finally, the first piston nudges the second piston from its previously described seat such that the larger cross-sectional area thereof is exposed to fluid pressure whereby it will be rapidly shifted to the end of its channel to isolate the slow leak from the remainder of the system.

As a further feature of the instant invention, and as will be described in greater detail, a spring biased plunger is released to lock the second piston in its isolating position after it has shifted, and as a further feature an electrical system is provided to provide an indication to the driver any time the safety valve of the instant invention has operated (indicating a leak in the braking system).

As another feature of the instant invention, it will be appreciated that individual safety valves constructed in accordance with the teachings of the instant invention may be provided in each conduit line which carries fluid to the individual wheels. Alternatively, two such valves may be provided in a common casing, one valve to service a conduit supplying the two front wheels and the other to service a conduit carrying fluid to the two rear wheels. Furthermore, three or four of the safety valves can be enclosed in a common housing with the individual outports thereof servicing the conduits supplying each wheel of the vehicle.

As a particularly advantageous feature of the instant invention it is proposed that when a common housing encloses a plurality of safety devices, such housing shall be directly secured to the master cylinder in a manner such that the fluid of such master cylinder will communicate directly with the individual safety valves within the common housing without the need for any conduit therebetween. This arrangement assures that there will be no unprotected portion of the system.

Accordingly, it is an object of the instant invention to provide a hydraulic safety valve device which is designed to isolate a leaking portion of a hydraulic pressure system from the remainder of the system such that an automobile or other device may be safely brought to a stop despite the occurrence of a leak.

Another object of the instant invention is to provide such a hydraulic safety device which will operate to isolate a leaking portion of the pressure system from the remaining portion of the system in the event of either a rapid leak or a slow leak occurring over an extended period of time.

Still another object of the instant invention is to provide such a hydraulic safety valve device which is simple, reliable, and inexpensive to manufacture.

Still another object of the instant invention is to provide such a hydraulic safety valve device which is especially designed to cooperate with existing raking systems.

Still another object of the instant invention is to provide such a hydraulic safety valve device which is easily adapted to existing closed pressure braking systems.

Still another object of the instant invention is to provide such a hydraulic safety valve device which can be manufactured as individual units and inserted in individual conduit lines or, alternatively, can be duplicated and housed in a common casing and thereby simply and easily secured in operating relationship to the master cylinder of a closed pressure braking system such as those used in automobiles.

Yet another object of the instant invention is to provide such a hydraulic safety valve device which incorporates a novel variable cross-sectional area slidable piston by means of which the device functions to isolate a leaking portion of a brake system in an extremely quick-action, single stroke mode of operation.

Yet another object of the instant invention is to provide such a hydraulic safety valve device which includes a plurality of distinct chambers therein, one of which maintains the main fluid supply of the system isolated from remaining sections of the closed hydraulic pressure system.

Still another object of the instant invention is to provide such a hydraulic safety valve device which will isolate a leaking portion of a closed system which includes a spring biased plunger which rapidly acts to lock a slidable piston in sealing relationship with the exit port of the device once the safety valve device has operated.

Still another object of the instant invention is to provide such a hydraulic safety valve device which includes electrical circuit means cooperating with the aforementioned plunger to provide a visual indication to the driver that there has been a leak in his braking system.

Other objects and a fuller understanding of the instant invention may be had by referring to the following description and drawings, in which:

FIGURE 1 is a schematic illustration of the braking system of an automobile or other vehicle adapted with a safety device of the instant invention;

FIGURE 2 is a view taken along the arrows 2—2 of FIGURE 1 or, alternatively, would be a side view in section of a single valve unit of the instant invention; and FIGURE 3 is a view in section taken along the arrows 3—3 of FIGURE 1 illustrating the manner in which a hydraulic safety valve device of the instant invention may be cooperatively secured to a master cylinder and included in an existing closed pressure system.

Turning to FIGURE 1, there is schematically illustrated the braking system of an automobile. As well known in the art, such a system customarily includes a master cylinder 10, one end 12 of which cooperates with the brake pedal 14 while the opposite end 16 functions to provide brake fluid to braking apparatus located in each of the wheels schematically illustrated at 18, 20, 22 and 24. It will be appreciated that although FIGURE 1 illustrates the braking system of an automobile, and in fact although the remainder of this specification will be described in terms of an automobile braking system, the instant invention has much broader application and indeed may be utilized in any environment wherein it is desirable to prevent the loss of fluid throughout the entire system in the event of a leak occurring in some small portion thereof.

As well understood, the brake pedal 14 is linked to a piston 26 traveling within the casing 28 which communicates with the end 12 of the master cylinder. In the normal system (without the safety device 38 of the instant invention) upon depression of the brake pedal 14, fluid will be dispersed out the exit side 16 of the master cylinder and through the various conduits such as 30, 32 and 34 to the braking apparatus provided in each of the wheels.

The customary braking apparatus includes a pair of expansible brake shoes (not shown) which expand to frictionally engage the drum of the respective wheel when pressure has been applied by means of the brake pedal 14. Since such system is so well understood in the art and in common use today, further explanation thereof is thought unnecessary at the present time. For purposes of understanding the instant invention, it is sufficient to point out that in present day braking systems, should a leak develop at any point in the system such as by the occurrence of a break in the conduit 36, the entire fluid supply of the system would rapidly leak out of that break leaving the driver helplessly unable to bring his vehicle to a stop. The tremendous number of accidents and loss of life which results therefrom is apparent.

In accordance with the instant invention, there is provided a safety device illustrated generally at 38 which will rapidly isolate any leaking portion of the system, from the remainder of the still operative portion of the system. Should a leak develop in the conduit 36, the device 38 will rapidly operate to isolate conduits 30 and 36 together with the leak and the wheels 18 and 20 associated therewith from the remainder of the portion such that the rear braking system operating at wheels 22 and 24 will still be operable. Similarly, should a leak develop in the conduit 34, the device 38 will rapidly operate in a manner to be further described, to isolate the conduit 34 and the braking apparatus associated with the wheel 24 from the remainder of the system such that fluid will remain in that system to operate the brakes at wheels 18, 20 and 22. It is to be appreciated that although FIGURE 1 illustrates a safety device 38 which is cooperative with only three outgoing cables 30, 32 and 34, as will be further described, the safety valve 38 could conveniently be constructed to include four output ports, each of which would cooperate with the conduits associated with each wheel 18, 20, 22 and 24 respectively.

Also to be appreciated from the schematic showing of the system in FIGURE 1, is the fact that the safety device 38 is connected into the system at a point which will most safely prevent the occurrence of a leak occurring in any part of the system which is not protected by the safety valve device 38. Thus, as will be described in greater detail, the safety device 38 is directly secured onto the master cylinder 10 such that there is no conduit and hence no chance of a leak developing between the master cylinder 10 and the safety valve device 38. Instead, fluid flows directly from the master cylinder 10 into device 38.

FIGURE 3 illustrates one preferred embodiment of the instant invention by means of which the safety device 38 may be simply and operatively connected to the master cylinder 10. As illustrated in FIGURES 1 and 3, securing bolt 40 passes through the safety device 38 and into screw threaded engagement with internally threaded portion 42 of the wall 44 of the master cylinder 10. The lower portion of the bolt 40 includes a hollow passageway 46 which communicates with the fluid on the inside of the master cylinder at one end 50 thereof while at the opposite end 52 communicates by means of holes 54 with a longitudinally extending channel 56. Channel 56 communicates with necked passageways 58 which lead to the individual working components of each quick-acting valve structure 60 (FIGURE 2) housed in the passageways 62, 64 and 66 in a manner to be explained in greater detail.

With this construction a single conduit 30 carries braking fluid to the two front wheels 18 and 20 by means of a T-joint 63 while the rear wheels 22 and 24 are individually protected by means of conduits 32 and 34. Obviously, if desired, the casing of the device 38 could be enlarged or made smaller for more or less valves of the type shown in FIGURE 2 depending on the requirements of the system within which the device was being utilized. The important feature of the system defined in FIGURES 1 and 3 is not the number of valves enclosed but the fact that all of such valves are simply and cooperatively housed within an enclosure 38 which is of simple design and therefore easy to manufacture. Furthermore, the fact that such common housing can be simply and easily secured to existing portions of a system in a manner which eliminates the possibility of leaks developing in conduits joining the two devices represents a significant advancement over the prior art.

Turning to FIGURE 2, there is illustrated a valve structure 60 which is intended to fit within the cooperating chambers 62, 64 and 66 of the housing 38 of FIGURE 3. Alternatively, it will be understood that in the event that a common housing such as 38 of FIGURE 3 is not being utilized, but instead individual safety devices are being inserted in individual lines, then the individual mechanisms will still be similar to that illustrated in FIGURE 2. The only modification would be the requirement that there be some sort of entry port (indicated in phantom at 68) in place of the longitudinally extending channel 56 utilized in the common housing. Otherwise the side view presented in FIGURE 2 would also represent the side view of a single valve device. For ease of identification throughout the remainder of the specification, discussion will be directed to a multiple device such as that illustrated in FIGURES 1 and 3.

As best seen in FIGURE 3, each chamber 62, 64 and 66 actually comprises a pair of coaxial channels 70 and 72 with the channel 70 being of smaller diameter than the channel 72. Slidably disposed within the channel 70 is a first piston structure 74 which includes elongated neck portion 76; a trailing hollowed-out, rear section 78 which communicates with the neck passage 58; and an O-ring assembly 80 which seals the rear section 78 from the remainder of the channel 70.

Appreciating that in each of the channels 62, 64 and 66 of FIGURE 3 there is such a piston arrangement 74, it becomes apparent that regardless of what takes place to the left of the pistons 74, the primary fluid supply in the master cylinder 10 will always remain isolated. This is a particularly advantageous feature since although fluid may leak out of one of the devices, say for example from channel 62, there will always be a primary fluid source to provide operating power for the devices within the chambers 64 and 66.

Slidably movable within the second larger chamber 72 is a second piston arrangement 82 which includes a head 84 which normally seats against the shoulder 86 defining the juncture between the channels 70 and 72. The second piston 82 further includes a shank portion 88 which thereby defines a recess 90, the purpose of which will be explained in greater detail, shank 88 being further secured to the forward hollowed-out portion 92 designed to seat upon and seal the exit port 94 defined through the removable end plug 96. A biasing spring 98 aids in maintaining the second piston 82 to the right of channel 72 (as viewed in FIGURE 2) while a second biasing spring 100 normally maintains the first piston 74 in the position shown in FIGURE 2 with respect to the second piston arrangement 82.

A bypassing channel 102 communicates at one end 104 with a channel 70 while at its other end 106 with the enlarged channel 72. For reasons to be further explained, the diameter of opening 104 is larger than the diameter of opening 106.

In operation, the valves and system are filled with braking fluid and bled of air bubbles by means of a bleed valve 108 which is otherwise maintained closed. In normal operation, with no leaks appearing anywhere in the system, depression of the brake pedal 14 of FIGURE 1 applies fluid under pressure into each of the hollowed-out, rear portions 78 of the respective first pistons 74. The piston 74 is therefore forced to the left in FIGURE 2 against the bias of spring 100 which thereby transfers fluid under pressure through the enlarged opening 104, the by-passing channel 102, through the smaller opening 106, and out the exit port 94 to the conduit and brake shoe associated with that particular device. Upon the release of pressure from the brake pedal 14, the returning fluid together with the biasing spring 100 returns the piston 74 to the position shown in FIGURE 2.

The fact that opening 106 is restricted, or smaller when compared with opening 104, creating a small pressure drop within the chamber 72 when compared with the pressure in chamber 70. However, it will be appreciated that the pressure within chamber 70 acts on a reduced cross-sectional area of the face 110 of the head 84 (reduced by the diameter of shoulder 86) such that the force developed on face 110 is still smaller than the total opposing force on the left hand surface area 112 of the forward section 92 of the second piston. This total opposing force is comprised of the force developed by spring 98 and the force developed by the pressure in chamber 72 times the surface area of the left hand face 112 of the portion 92. Thus in normal operation the second piston 82 remains seated against the shoulder 86 such that there is a continual fluid flow from the chamber 70 through the bypass valve 102 and out the exit port 94 to the brakes.

In the event of a rapid leak such as would be caused by severance of a conduit such as 30, the pressure drops within chamber 72 such that the pressure on the right face 110 of head 84 now exceeds pressure on the left face 112 of the second piston 82. Consequently the piston 82 begins moving to the left. As soon as head 84 thereof unseats from the shoulder 86, the total surface area of the face 110 is now exposed to the fluid under pressure within chamber 70. With the effective area of the piston 82 instantaneously increased, the entire piston shoots rapidly to the left in FIGURE 2 such that the forward portion 92 thereof seats upon and seals the exit port 94 isolating the leaking portion of the brake system from the remaining operative portion of the brake system.

Once the piston is in its sealing position with respect to the exit port 94, a plunger 114 biased downwardly by the spring 116 slips into the recess 90 to lock the piston in its sealed position. Simultaneously the movement of plunger 114 closes normally opened contacts 118 to energize a signalling means 120 to warn the driver that there is a leak in a particular wheel of the braking system. If desired, a buzzer could simultaneously be activated to attract the driver's attention.

In the event of a slow leak in the system, operation is somewhat different. By a slow leak is meant a leak of such a nature that the pressure within chamber 72 does not drop sufficiently to start the movement of the second piston 82 in the manner previously explained. However, with a slow leak, a certain amount of fluid will be lost out of the leaking portion of the system whenever the brake pedal 14 is depressed.

Consequently, when the operator takes his foot off the brake pedal 14, there will be less fluid flowing in the reverse direction toward the safety device and hence the first piston valve 74 will not return all the way to the right of the channel 70 in FIGURE 2. Instead it will stop somewhere left of the position illustrated in FIGURE 2 and the extra space to the right of piston 74 will be filled up by extra fluid supplied by the fluid make-up feature of the system which, as well known in the art, amounts to an extra supply of fluid usually in the uppermost portion 122 of the master cylinder 10 which, with the aid of gravity, will continually add fluid to the system as necessary.

With repeated application of the brakes, the piston 74 will have crept sufficiently far to the left within the chamber 70 such that the neck 76 thereof will finally abut the face 110 of the second piston 82. Upon the next depression of brake pedal 14, the second piston 82 will be unseated such that the entire surface 110 of face 84 will be exposed to the fluid pressure within the device and the piston 82 will therefore slide rapidly to the left to finally seal the slow leak from the remainder of the system. As in the case of a rapid leak, once the recess 90 faces the plunger 114 the plunger descends to lock the piston 82 in place and the circuit including the indicator 120 is energized to provide an indication of the leak.

From the above it will be appreciated that the instant invention makes possible the provision of a hydraulic safety valve device which will isolate a leaking portion of a closed pressure system from the remaining operative portion of the system in the event of either a slow or rapid leak. The device is simple to manufacture, and therefore reliable and inexpensive; and a plurality of such devices may be conveniently enclosed within a common housing which may be easily and cooperatively joined to an existing portion of the system such as the master cylinder. Although the invention has been described with respect to an automobile braking system, it is apparent to those skilled in the art that the instant invention has many more applications within many different types of hydraulic systems and is, therefore, to be limited only by the appended claims.

The embodiments of the invention in which an exclusive privilege or property is claimed are defined as follows:

1. A safety device for isolating a defective portion of a closed pressure system from the remaining portion thereof, said safety device comprising:
a first channel communicating with a fluid supply at one end thereof and a second channel at its opposite end thereof, said second channel communicating with said first channel at one end and an exit port at its other end thereof;
a first piston slidably positioned in said first channel and biased toward said one end of said first channel, said first piston being urged toward the second end of said first channel when pressure is applied to said first piston and returning toward said one end when pressure is removed from said first piston;
a second piston slidably positioned in said second channel and normally seated against said opposite end of said first channel;
a bypass conduit path communicating with said first and second channels;
whereby under normal conditions fluid pressure applied to said first piston will be transferred through said bypass conduit to said second channel and to said exit port; and
wherein said second channel has a larger diameter than said first channel whereby a shoulder is defined at the juncture of said first and second channels, said second piston being normally seated against said shoulder whereby a reduced cross-sectional surface of said second piston is presented toward said first channel, and whereby upon movement of said second piston away from said shoulder an enlarged surface will be presented toward said first channel.

2. The safety device of claim 1, wherein the end of said bypass conduit path which communicates with said first channel is larger than the end of said conduit path which communicates with said second channel whereby the pressure in said second channel is normally less than the pressure in said first channel.

3. The safety device of claim 2, wherein biasing means are provided in said second channel to aid in maintaining said second piston seated against said shoulder in normal operation, and wherein, upon the occurrence of a sharp pressure drop in said second channel, said second piston will be unseated from its normal position against said shoulder.

4. The safety device of claim 3, and further including biasing means interposed between said first and second piston means to return said first piston means toward said first end of said first channel when pressure is removed from said first piston means, said first piston means including a forward portion which strikes said second piston to unseat same after a predetermined amount of fluid has been lost from a slow leak.

5. The safety device of claim 3, and further including spring biased plunger means operable to lock said second piston in sealing position with respect to said exit port.

6. The safety device of claim 5, and including normally non-energized indicator means energized upon the sealing of said exit port by said second piston to provide an indication of a leak.

7. In an automatic braking system including a master cylinder; a plurality of fluid operated expansible braking shoes; and conduits communicating with said master cylinder and said braking shoes; the improvement comprising a hydraulic safety device interposed between said master cylinder and said conduits, said hydraulic safety device including:
a casing secured to said master cylinder, said casing having a plurality of passageways defined therein, one end of each of said passageways communicating with the fluid disposed within said master cylinder;
each of said passageways including slidable piston means operable to seal off a second end of the respective passageways in response to pressure drops due to leakages in portions of the braking system associated with the respective passageways, each of said piston means including a first area portion thereof which confronts fluid in said passageway when there is no leak in the respective portion of the system, and a second area portion larger than said first area portion which confronts said fluid once said piston means has begun its travel to seal off the respective second end;
each of said passageways further including additional piston means to isolate said master cylinder from said respective slidable piston means.

8. In the system of claim 7, wherein said additional piston means includes a forward portion which strikes the respective slidable piston means to unseat same and expose said second area portion thereof to fluid when a slow leak has occurred over a predetermined length of time in a portion of the system associated with the respective passageways.

9. In the system of claim 7, wherein each of said passageways includes a first channel which guides said additional piston means, and a second channel which guides said slidable piston means, said second channel having a larger diameter than said first channel such that a shoulder is defined at the juncture thereof, said first area portion of said slidable piston means being formed when said slidable piston means abuts said shoulder, said second, larger area portion being formed when said slidable piston means is unseated from said shoulder, and further including a bypass conduit which communicates with said first and second channel.

10. In the system of claim 9, wherein the end of said bypass conduit path which communicates with said first channel is larger than the end of said conduit path which communicates with said second channel whereby the pressure in said second channel is normally less than the pressure in said first channel.

11. In the system of claim 7, wherein said casing is directly secured to said master cylinder by a fastening element which includes an internal conduit network which communicates with each said passageway and the fluid in said master cylinder.

References Cited

UNITED STATES PATENTS

| | | |
|---|---|---|
| 1,795,818 | 3/1931 | Allred et al. |
| 2,151,940 | 3/1939 | Rumsey. |
| 2,585,511 | 2/1952 | Sparks et al. |

MARTIN P. SCHWADRON, Primary Examiner

R. R. BUNEVICH, Assistant Examiner

U.S. Cl. X.R.

303—84; 188—151